United States Patent [19]

Rill, Jr.

[11] Patent Number: 4,627,797

[45] Date of Patent: Dec. 9, 1986

[54] STANDBY AQUARIUM PUMP

[76] Inventor: Robert W. Rill, Jr., P.O. Box 20711, Sarasota, Fla. 33583-4711

[21] Appl. No.: 787,607

[22] Filed: Oct. 15, 1985

[51] Int. Cl.$^4$ .................. F04B 35/04; F04B 17/00
[52] U.S. Cl. .................................. 417/411; 43/57
[58] Field of Search .............. 43/57; 417/415, 411, 417/412, 413, 44

[56] References Cited

U.S. PATENT DOCUMENTS

| 2,143,620 | 1/1939 | Clark | 307/66 |
|---|---|---|---|
| 2,960,321 | 11/1960 | Stoots | 43/57 |
| 2,972,057 | 2/1961 | Boehmer | 307/66 |
| 3,015,281 | 2/1962 | Umholtz | 417/411 |
| 3,216,650 | 11/1965 | Thyreen | 417/413 |
| 3,309,067 | 3/1967 | Brewster | 417/411 |
| 3,323,249 | 6/1967 | Randall | 43/57 |
| 3,356,857 | 12/1967 | Strasen | 307/48 |
| 3,776,666 | 12/1973 | Ludwig | 417/411 |
| 3,842,288 | 10/1974 | Bradshaw | 307/66 |
| 4,218,195 | 8/1980 | Shure | 417/411 |
| 4,257,540 | 3/1981 | Wegmann | 417/411 |
| 4,575,640 | 3/1986 | Martin | 307/66 |

Primary Examiner—William L. Freeh
Attorney, Agent, or Firm—Charles J. Prescott; Raymond H. Quist

[57] ABSTRACT

A standby aquarium pump is disclosed which contains a direct current power supply and relay means which will automatically connect this power supply to start the standby pump when alternating current power is interrupted causing the AC powered pump to stop operating. An alternate embodiment provides rectified alternating current as the normal power supply and the direct current power as a standby or auxiliary power source. A rotary direct current motor is employed to drive a reciprocating piston type air pump using an operating rod eccentrically mounted in a flywheel mounted on the motor drive shaft. Electric shock hazard is reduced by containing all 120 volt alternating current connections in a separate housing secured to the main housing. Thus, the main housing can safely be opened to install or replace the batteries by the user who will be exposed only to the low voltage direct current elements.

5 Claims, 9 Drawing Figures

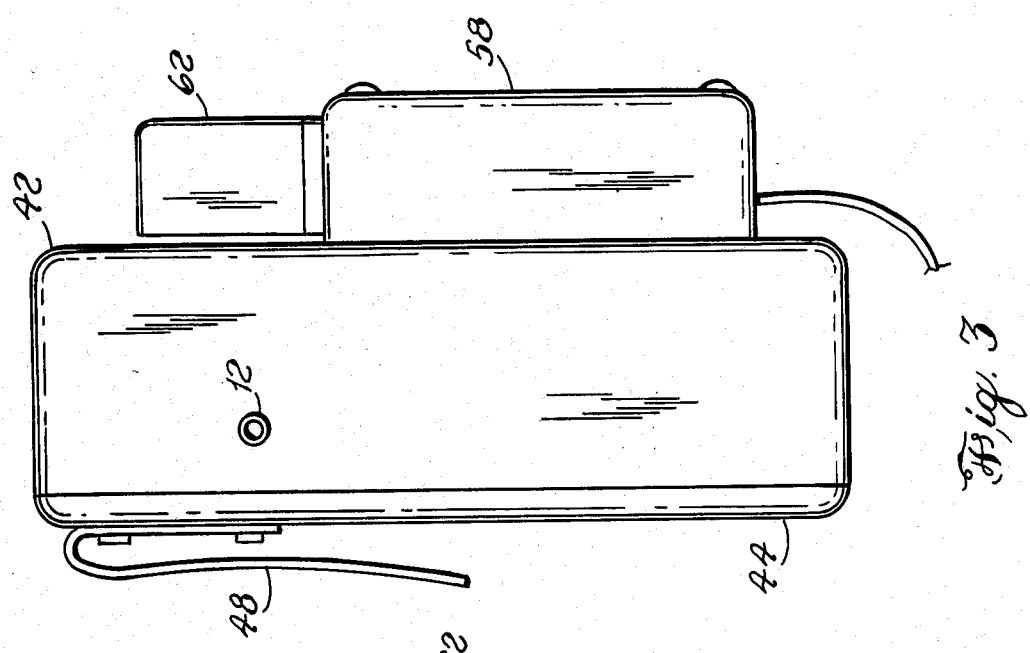
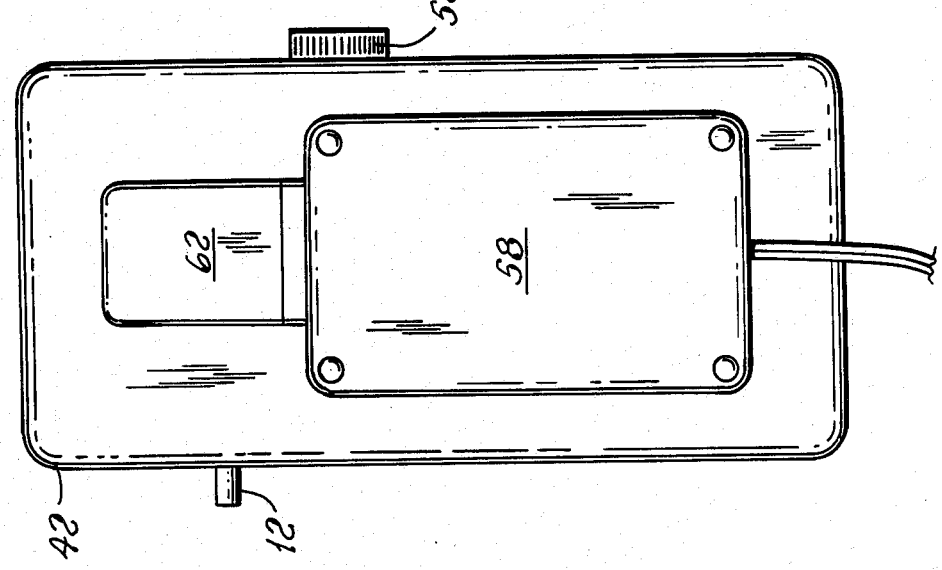
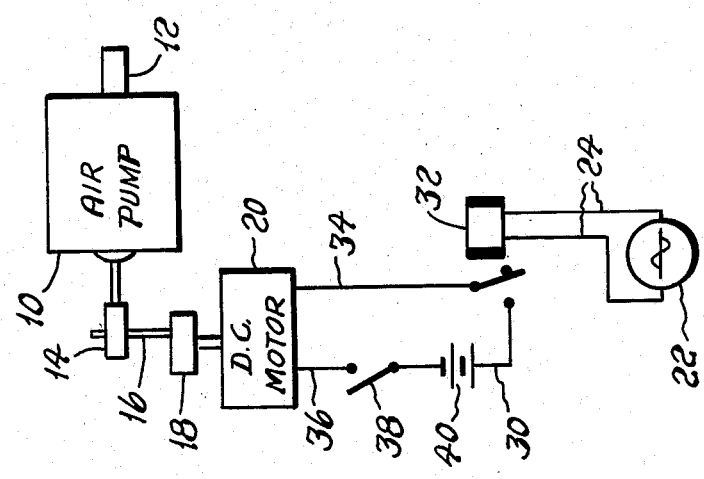

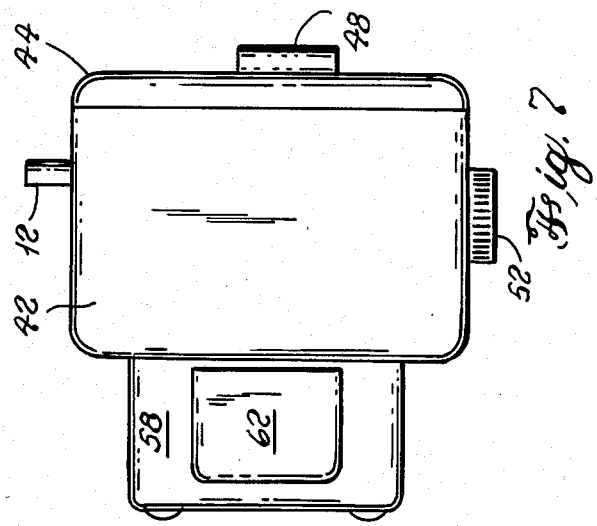
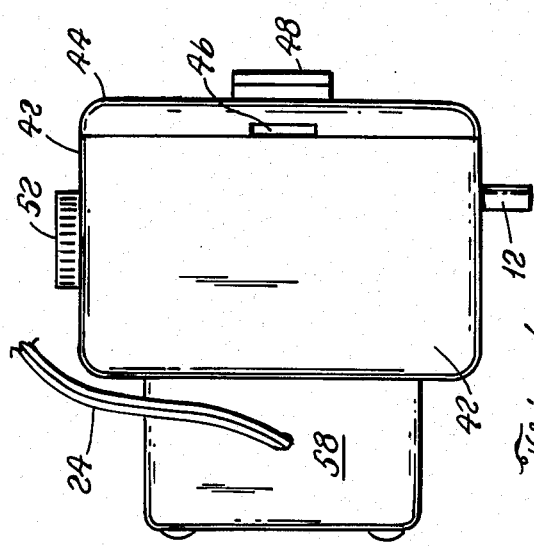
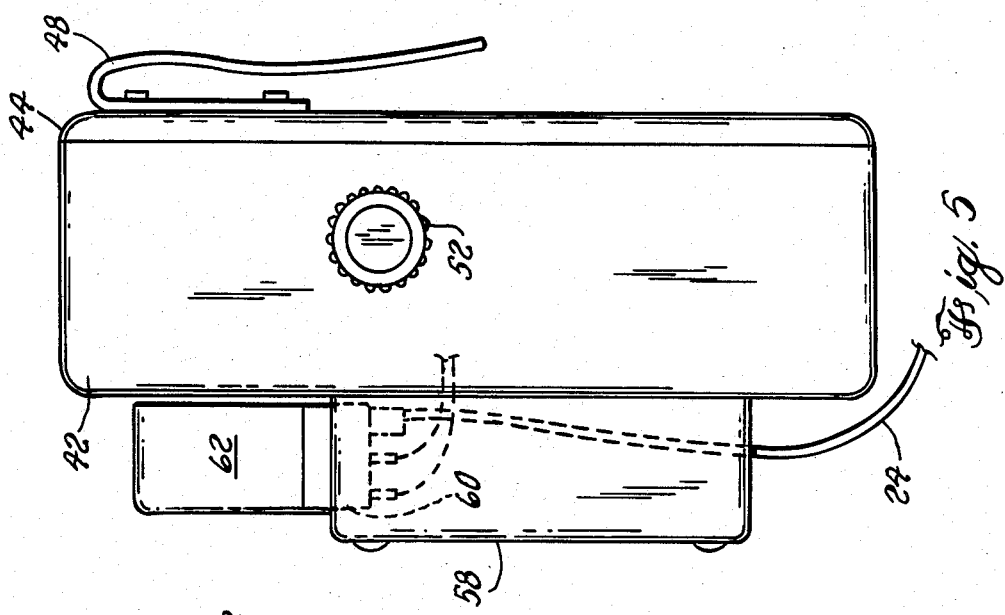
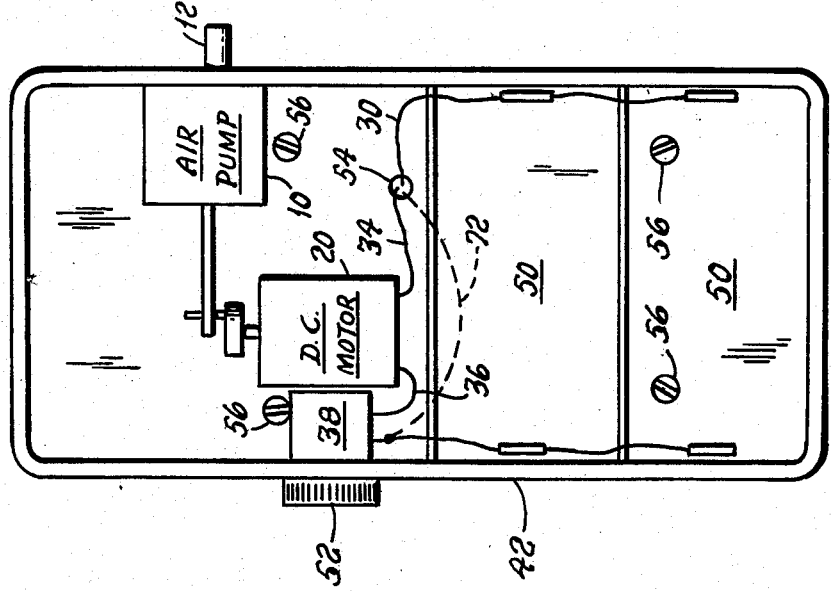

STANDBY AQUARIUM PUMP

BACKGROUND OF THE INVENTION

1. Field of the Invention

This invention relates generally to an aerating pump for an aquarium, and more particularly to a standby aerating pump having a direct current power supply which automatically takes over for the ordinarily used aerating pump when the alternating power supplied by a utility is interrupted.

2. Description of Related Art

Water in the confined area of an aquarium tank can, in a few hours, become deficient in the amount of dissolved air necessary to support a fish population if the aerating pump used to supply the air ceases to operate. Power loses occurring during hurricanes or other calamitous events have consequently caused the death of valuable fish collections. Even a circuit breaker tripping unobserved in the middle of the night can have the same effect Although emergency or auxiliary power supplies are commercially available for use when public utility power fails, generally such auxiliary power supplies are in place in only a few places, such as hospitals or other critical facilities. Aquarium aerator pumps presently available are equipped for operation only on alternating current by plugging in to the utility power.

Battery powered aerating pumps have been disclosed for use with various types of live bait containers. U.S. Pat. No. 3,216,650, entitled "Liquid Aerator or Pump", the invention of A.A. Thyreen, discloses such a battery powered aerating pump. This pump may be energized either by electric dry cell batteries contained within the pump housing, or by an outside 6 or 12 volt D.C. supply such as an automobile battery. The Thyreen aerating pump is intended for use with a portable live bait container and not for use with a fixed aquarium. The need for replacing or recharging batteries militates against the use of this type of battery powered aerating pump as the sole pump for fixed aquariums, and there is no disclosure or suggestion that the pump would automatically begin operation upon interruption of alternating current power supplied by a public utility.

.U.S. Pat. No. 3,323,249, entitled "Aerated Live Bait Container", the invention of B.D. Randall, discloses an aerating arrangement where an impellor is driven by self-contained batteries or by an external direct current supply. No disclosure or suggestion is made for use of this arrangement as a backup for occasions when alternating current power is interrupted.

It is therefore an object of this invention to provide a standby aerating pump for a fixed aquarium which will automatically begin operation when alternating power is interrupted causing the regular aerating pump to stop operating.

It is a further object of this invention to provide a standby aerating pump for a fixed aquarium which will automatically stop operation when alternating current power becomes available again.

It is still another object of this invention to satisfy both of the above modes of operation in a single unit.

It is also an object of this invention to provide an aerating pump for a fixed aquarium which will be attractive in appearance because of the housing utilized.

It is also an object of this invention to provide a housing for a standby aerating pump which permits ready replacement of the batteries used as the power supply while continuing to keep the 120 volt alternating current connections safely housed.

SUMMARY OF THE INVENTION

The present invention is a standby aquarium pump for a fixed aquarium which will provide a supply of air through an air stone in the conventional manner when the power supply to the normally used pump is interrupted. As is typical with conventional aquarium pumps, alternating current supplied by a public utility is used to supply power for the ordinarily used aerating pump. With this invention however, if the alternating current power is interrupted, an auxiliary or standby aerating pump having a self-contained power supply will automatically take over or continue the task of aerating the aquarium. A direct current motor is used as the pump motor permitting the use of readily available dry cells or batteries as the power supply for the standby pump. The alternating current energizes a relay on the standby pump housing which keeps the circuit to the standby pump open as long as alternating current power is available. During this time rectified alternating current may also be used to energize the pump. The dry cells are readily installed and replaced in an easily opened main housing. In order to prevent electric shock by inadvertent contact with the 120 volt alternating current carrying parts of the system, a separate housing, not readily opened, contains these parts. The main housing is provided with a clip for mounting the aquarium pump on an aquarium tank, and an external switch is provided on the main housing so that the pump may be manually disconnected.

BRIEF DESCRIPTION OF THE DRAWINGS

FIG. 1 is a schematic showing the mechanical and electrical arrangement of the aquarium pump of this invention;

FIG. 2 is a front elevation of the housings of the aquarium pump;

FIG. 3 is a left side elevation of the housings of the aquarium pump;

FIG. 4 is a rear elevation of the housings of the aquarium pump;

FIG. 5 is a right side elevation of the housings of the aquarium pump;

FIG. 6 is a bottom view of the housings of the aquarium pump;

FIG. 7 is a top view of the housings of the aquarium pump;

DETAILED DESCRIPTION OF THE INVENTION

Figure 9:
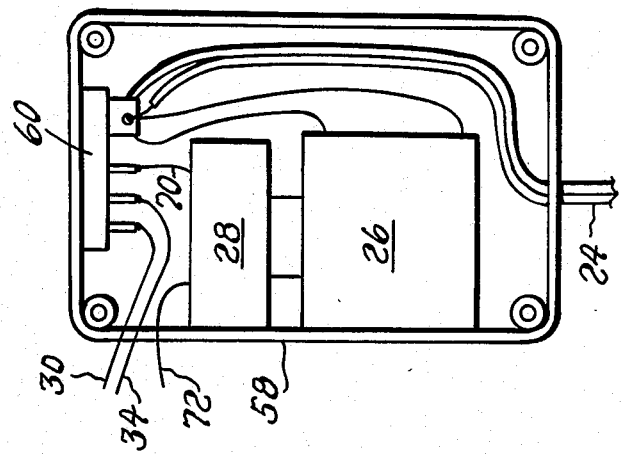
FIG. 9 is an elevation of the housing containing the electrical components of the alternate embodiment.

Referring to FIG. 1, air pump 10 pumps air through pump outlet 12. In the usual manner, a tube (not shown) is connected to pump outlet 12 to provide air through an air stone positioned in an aquarium tank in the conventional way. Air pump 10 is operated by piston rod 14 which is caused to be driven in a reciprocal manner by an operating rod 16 eccentrically mounted in flywheel 18 thereby causing the piston of said air pump to reciprocate and air pump 10 to expel air through outlet 12. Flywheel 18 is rotated by direct current rotary motor 20. Although the particular type of air pump and driving arrangement illustrated represent those actually used, these elements could be of alternative types.

Alternating current source 22, which typically would be a wall receptacle, is connected by conductors 24 to relay 32. When relay 32 is not energized, as would occur during an interruption of the public utility alternating current supply, a circuit is closed between direct current rotary motor 20 and battery 40 via conductors 30, 34, and 36 and switch 38. Whenever the alternating current supply is resumed, relay 32 will disconnect batteries 40 from DC motor 20, putting the aerating pump of this invention in a standby mode.

Although it would be possible to put all the components of the aquarium pump of this invention in a single housing, a special housing arrangement has been devised which will facilitate installation or replacement of batteries while preventing electric shock caused by inadvertent touching of any part carrying the 120 volt alternating current.

Referring to FIGS. 2–7, a first housing 42 has a back 44 which is readily removeable by using coin slot 46 (FIG 6). Clip 48 on back 44, permits ready mounting of the aquarium pump on an aquarium tank. FIG. 4 shows first housing 42 with back 44 removed. Receptacles 50 are provided for holding batteries, such as D-type alkaline batteries. Air pump 10 is shown to have outlet 12 extending through the side wall of first housing 42. Switch 38 is shown to have external operating knob 52. Conductor 30, from one battery terminal, and conductor 34, which goes to DC motor 20, pass through opening 54 in housing 42. It will be observed that the heads 56 of four screws are located within first housing 42. These screws secure second housing 58 to first housing 42. Second housing 58 receives conductors 24 which carry the 120 volt alternating current. Within housing 58 is located terminal block 60 (FIG. 5) to which alternating current conductors 24 and direct current conductors 30 and 34 are appropriately connected. Consequently, access to the terminal block 60, where the connections to the 120 volt lines are made, can only be had by removing the four screws which secure second housing 58 to first housing 42. This prevents inadvertent touching of these high voltage lines even when back 44 of first housing 42 is removed, for example to install or replace batteries.

Plugged into the top of second housing 58 is a commercially available module 62 incorporating relay 32. This module may also be removed and installed without exposure to the 120 volt connections. The module 62 actually used was an Archer 125 volt AC double pole, double throw, plug-in relay available from Radio Shack.

Although risk of electrical shock would be eliminated by unplugging the aquarium pump of this invention, it should be recognized that the electric receptacles into which such pumps are plugged are often located behind the aquarium tank or in other locations which may cause the user to ignore this precaution. In conjunction with the increased conductivity of electricity associated with water spillage from the aquarium, the additional protection from electrical shock afforded by the housing arrangement is a desirable adjunct.

The present invention not only performs its primary function of maintaining aquarium pump operation even when alternating current power is interrupted when a circuit breaker trips or otherwise, but it also permits simple and safe replacement of those components likely to be replaced by the user, i.e. the batteries and relay module 62. A new set of alkaline D cells will operate the backup aerating pump for up to 96 hours, normally enough to cover even a severe power outage.

Figure 8:
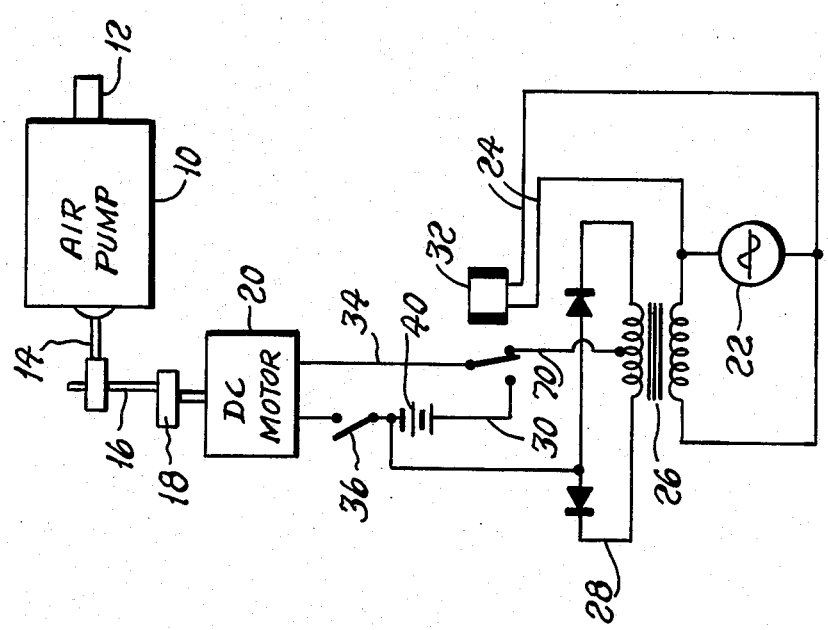
FIG. 8 is schematic showing the mechanical and electrical arrangement of an alternate embodiment of the invention.

Although the invention has been designed and built as a backup pump to a regularly used aerating pump, only a slight modification is necessary to provide the capability of a pump which will operate on alternating current so long as that supply is available, and to automatically switch to its self contained direct current supply during AC power interruptions. Referring to FIG. 8, a circuit is shown which is identical to that of FIG. 1 except that transformer 26 and rectifier 28 have been added. In this circuit, as long as alternating current is available, relay 32 will keep the circuit closed between DC motor 20 and rectifier 28. Upon interruption of AC power, relay 32 will connect battery supply 40 to DC motor 20. In keeping with the electric shock protection aspects of the invention, transformer 26 and rectifier 28 would be housed outside of housing 42, such as in housing 58.

FIG. 9 shows the interior of housing 58 as containing terminal block 60, transformer 26 and rectifier 28. Alternating current conductors 24 are connected to terminal block 60 as in the previous embodiment. A connection is also made from these terminals to the primary of transformer 26. Rectifier 28 is connected to the secondary of transformer 26. Conductor 70 leads from one output terminal of rectifier 28 to terminal block 60. Conductor 72 leads from the other output terminal of rectifier 28 to switch 38 of FIG. 4. As shown in FIG. 8, relay 32 will connect conductor 70 to conductor 34 when alternating current energizes relay 32. When alternating current is interrupted, relay 32 will connect conductor 30 to conductor 34.

The alternate embodiment depicted in FIGS. 8 and 9 provides an arrangement whereby a single aquarium pump having one direct current motor and one air pump will normally use alternating current as a primary source of power, and, when this primary source is interrupted, will automatically switch to the auxiliary power supplied by the dry cells.

Although preferred embodiments of a standby aquarium pump having a self contained power supply has been illustrated and described, it will be apparent to those skilled in the art that modifications may be made. It is intended that the appended claims cover all such modications falling within the spirit of the invention and the scope of the claims.

I claim:
1. A standby aquarium pump comprising:
housing means for containing the components of said aquarium pump;
an air pump;
a direct current motor operatively connected to drive said air pump;
a direct current power supply;
a circuit between said direct current motor and said direct current power supply;
relay means having an alternating current input and being energized by alternating current; and
said relay means operatively connected in said circuit between said direct current motor and said direct current power supply for opening said circuit whenever alternating current power is available and for closing said circuit whenever said alternating current power is interrupted whereby said standby aquarium pump is operated when alternat- ing power is interrupted and will not operate when said alternating current is available;

2. An aquarium pump in accordance with claim 1 further including:

switch means for manually connecting and disconnecting said circuit between direct current power supply and said direct current motor.

3. An aquarium pump in accordance with claim 2 further including:

a first housing member containing said pump, said motor and said direct current power supply; housing support means secured to said first housing member, whereby said aquarium pump may be mounted on an aquarium tank;

a second housing member, secured to said first housing member; and said relay means being mounted on said second housing member.

4. An aquarium pump in accordance with claim 3 wherein:

said switch means is mounted on the side of said first housing member.

5. An aquarium pump in accordance with claim 3 wherein:

said second housing contains the connections for said alternating current input.

* * * * *